US008645926B2

(12) United States Patent
Arcese et al.

(10) Patent No.: US 8,645,926 B2
(45) Date of Patent: Feb. 4, 2014

(54) TESTING A SYSTEM MANAGEMENT PROGRAM

(75) Inventors: Mauro Arcese, Fontana (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1675 days.

(21) Appl. No.: 12/049,796

(22) Filed: Mar. 17, 2008

(65) Prior Publication Data

US 2008/0244532 A1  Oct. 2, 2008

(30) Foreign Application Priority Data

Mar. 28, 2007 (EP) ..................................... 07105132

(51) Int. Cl.
*G06F 9/44* (2006.01)
*G06F 9/445* (2006.01)
(52) U.S. Cl.
USPC ............................ 717/134; 717/171; 717/177
(58) Field of Classification Search
None
See application file for complete search history.

(56) References Cited

U.S. PATENT DOCUMENTS

| | | | | | |
|---|---|---|---|---|---|
| 5,805,588 | A | * | 9/1998 | Petersen ....................... | 370/356 |
| 6,243,357 | B1 | * | 6/2001 | Sasagawa ..................... | 370/216 |
| 6,286,104 | B1 | * | 9/2001 | Buhle et al. ...................... | 726/4 |
| 6,487,718 | B1 | * | 11/2002 | Rodriguez et al. ............ | 717/177 |
| 6,715,143 | B1 | * | 3/2004 | Chantrain et al. ............ | 717/174 |
| 6,941,551 | B1 | * | 9/2005 | Turkoglu ....................... | 717/174 |
| 6,978,302 | B1 | * | 12/2005 | Chisholm et al. ............. | 709/224 |
| 7,240,336 | B1 | * | 7/2007 | Baker ........................... | 717/135 |
| 7,302,682 | B2 | * | 11/2007 | Turkoglu ...................... | 717/174 |
| 2005/0144619 | A1 | * | 6/2005 | Newman ....................... | 717/177 |
| 2005/0229175 | A1 | * | 10/2005 | McCrory et al. .............. | 717/177 |
| 2005/0289536 | A1 | * | 12/2005 | Nayak et al. .................. | 717/174 |
| 2005/0289538 | A1 | * | 12/2005 | Black-Ziegelbein et al. . | 717/177 |
| 2006/0048133 | A1 | * | 3/2006 | Patzachke et al. ............ | 717/168 |
| 2008/0201454 | A1 | * | 8/2008 | Soffer ............................ | 709/220 |
| 2009/0043561 | A1 | * | 2/2009 | Arieli et al. ..................... | 703/24 |

OTHER PUBLICATIONS

IBM, "Tivoli Management Framework User's Guide Version 4.1.1", 2003.*
Davoli, "VDE: Virtual distributed Ethernet", 2005, Proceedings of the First International confernece on Testbeds and Research Infrastructures for the DEvelopment of NeTworks and CoMmunities.*
Acharya et al., "Balancing Push and Pull for Data Broadcast", Proceedings of the 1997 ACM SIGMOD International Conference on Management of Data, 1997, pp. 183-194, XP002466749.
Nance B, "When Push Comes to Serve", Byte, McGraw-Hill Inc., vol. 23, No. 7, Jul. 1998, pp. 98-102, XP001079586, ISSN: 0360-5280.
Extended European Search Report, European Application Serial No. EP 07105132.0, Feb. 11, 2008, 4 pages.

* cited by examiner

*Primary Examiner* — Jason Mitchell
(74) *Attorney, Agent, or Firm* — Yee & Associates, P.C.; Jeffrey S. LaBaw

(57) ABSTRACT

A testing system for a reverse client-server system management program comprises a server connected to one or more recipient devices and emulating devices through one or more repeaters. The recipient devices act as targets for the management program and the emulating devices emulate one or more of the recipient devices, to enable an assessment of the scalability of the management program to a large number of targets. The repeaters direct management requests from the server to the target devices depending on the configuration of the hook and/or the nature of the operation requested by the management request. The recipient devices and emulating devices execute the required system management operation on receipt of a management request from the server (via the repeaters). The recipient devices and emulating devices generate and transmit a report detailing the outcome of the system management operation.

9 Claims, 3 Drawing Sheets

TESTING A SYSTEM MANAGEMENT PROGRAM

FIELD OF THE INVENTION

The present invention relates to a testing system, and a method and computer program for testing a system management program.

BACKGROUND OF THE INVENTION

Administrators of enterprise software systems face a particularly troublesome problem in attempting to deploy new applications (e.g. to ensure license compliance) to all the computer devices in their care. For simplicity, the devices to which it may be necessary to deploy new software, will be known henceforth as "recipient devices". This problem is proving particularly difficult in view of the ever-increasing complexity of today's IT environments and the growing use of pervasive devices (e.g. PDAs). There are a number of enterprise software distribution programs currently available (e.g. IBM's Tivoli Software Distribution program) which enable administrators to install, configure, and update software on networked systems from a single source system, thereby eliminating the need for manually updating software. These software distribution programs can implement "push" (i.e. a reverse client/server [or server-initiated]) or "pull" (client initiated) procedures to identify non-compliant recipient devices and transmit messages thereto to cause disseminated agents on the recipient devices to execute an installation code and thereby update their software. For simplicity, software distribution programs that implement a push procedure or a pull procedure will be known as a "push software distribution program" or a "pull software distribution program" respectively.

In the on-going pursuit of more reliable software, one of the issues that faces software designers, is that of assessing the scalability of the software. More particularly, for a software distribution program, the scalability issue becomes one of determining how the program would react when the number of recipient devices addressable by the tool significantly increases.

Scalability testing can be performed as a series of load tests with different "real-world" hardware or software configurations (henceforth known as "real targets"). Scalability testing may also involve simulating conditions in the application under test. These simulated conditions will be known henceforth as "virtual targets". The targets for a software distribution program, could include a large number (i.e. 50000-100000) of recipient devices to be addressed by the program.

There are a number of load/stress testing programs currently available ("An Overview of Load Test Tools", J. Buret and N. Droze, http://clif.objectweb.org/load_tools_overview.pdf) that produce simulated targets (e.g. simulated management requests from several remote clients) for pull software distribution programs. However, none of these load/stress testing programs can simulate targets for push software distribution programs.

In order to evaluate how a push software distribution program would react to a huge number of recipient devices it is usually necessary to simulate the recipient devices (e.g. by starting several processes on the same machine, wherein these processes emulate the target recipient). However, this can be problematic when the footprint of each target (recipient device) is very large, from a memory and/or CPU utilization perspective. In this case, only a small number of recipient devices can be emulated, which reduces the effectiveness of the scalability test.

Similarly, targets may be "virtual" entities wherein an actual operation should be executed by another entity. This may occur, for example, when a request is for a pristine operation (e.g. a base-metal OS installation) to a list of machines that have to be rebuilt from scratch. In this case, the management server is notified only when the reinstallation operation is completed for each target machine (i.e. not when the operation has been started at a pristine server). Thus, there is a set of virtual targets (the machines that have to be re-pristined) and one real physical target (the pristine server) that manages, controls and monitors the execution of the operation on the targets.

While the description so far, has focussed on the problem of testing the scalability of a system for distributing software (or software updates) to a large number of recipient devices, it will be appreciated that the scalability testing problem also applies to any other "reverse client-server" systems management application, where a single node issues requests to a consistent set of target recipient devices to execute a systems management action (e.g. installation of software, a general lifecycle operation on software (e.g. commit, remove, upgrade), hardware or software inventory operation, distributed job scheduling, distributed resource monitoring, etc.).

SUMMARY OF THE INVENTION

According to the invention, there is provided a testing system, and a method and computer program for testing a system management program as provided in the appended claims.

BRIEF DESCRIPTION OF THE DRAWINGS

An embodiment of the invention is herein described by way of example only, with reference to the accompanying figures in which:—

DETAILED DESCRIPTION

As mentioned above, the scalability testing problem is ubiquitous to any reverse client-server systems management application. Thus, it will be appreciated that whilst the following description focuses on the solution provided for a software distribution program, this scenario is for example purposes only. In particular, the methodology of the second embodiment is equally applicable to any other reverse client-server systems management application and is not restricted to the software distribution program example described below. Accordingly, the methodology of the second embodiment can be generalised to become a method of testing a system management program (rather than being limited to a methodology that is only applicable to the testing of a software distribution program).

Figure 1:
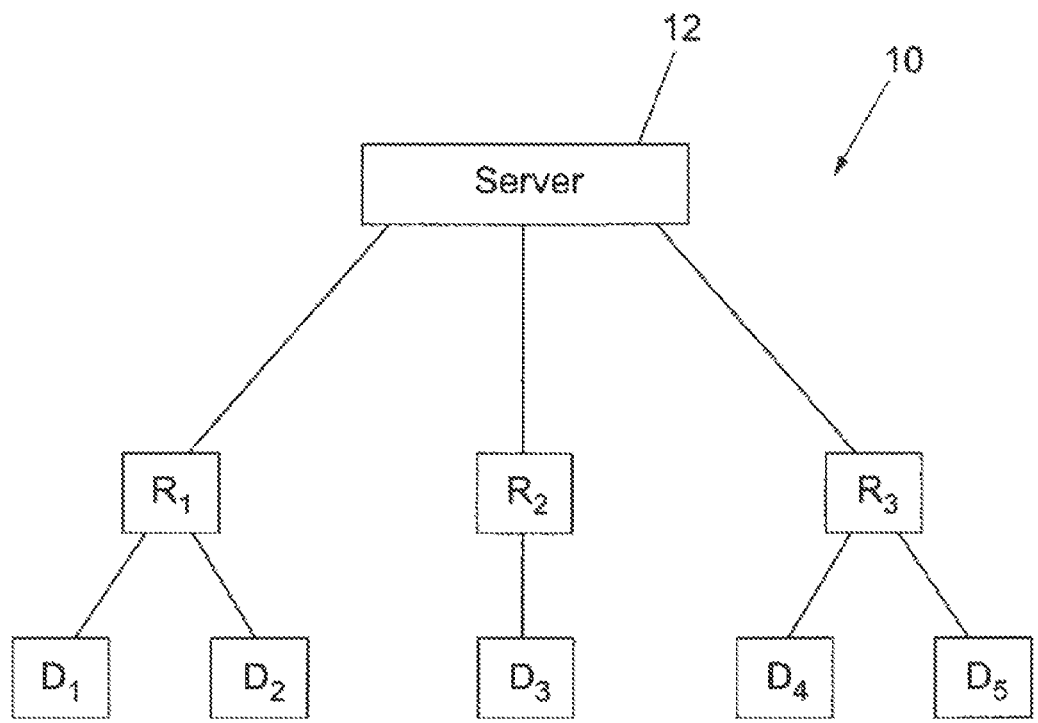
FIG. 1 is a block diagram of an exemplary traditional software distribution system.

Referring to FIG. 1, a traditional software distribution system 10 in a network comprises a distribution server 12 connectable to a one or more repeaters $R_1$-$R_3$, wherein the repeaters $R_1$-$R_3$ are in turn connectable to a one or more recipient devices $D_1$-$D_5$. Thus, the recipient devices $D_1$-$D_5$ effectively act as real targets for the traditional software distribution system 10. The repeaters are intermediate servers, each of which directly manages a group of targets (i.e. it could be a Gateway in a Tivoli Framework environment). Since the present embodiments are extendable to any reverse client-server systems management application, it will be noted that any such reverse client-server systems management system has the same overall hardware topology as that mentioned above (i.e. a server connectable to a one or more recipient devices through a one or more repeaters).

Figure 2:
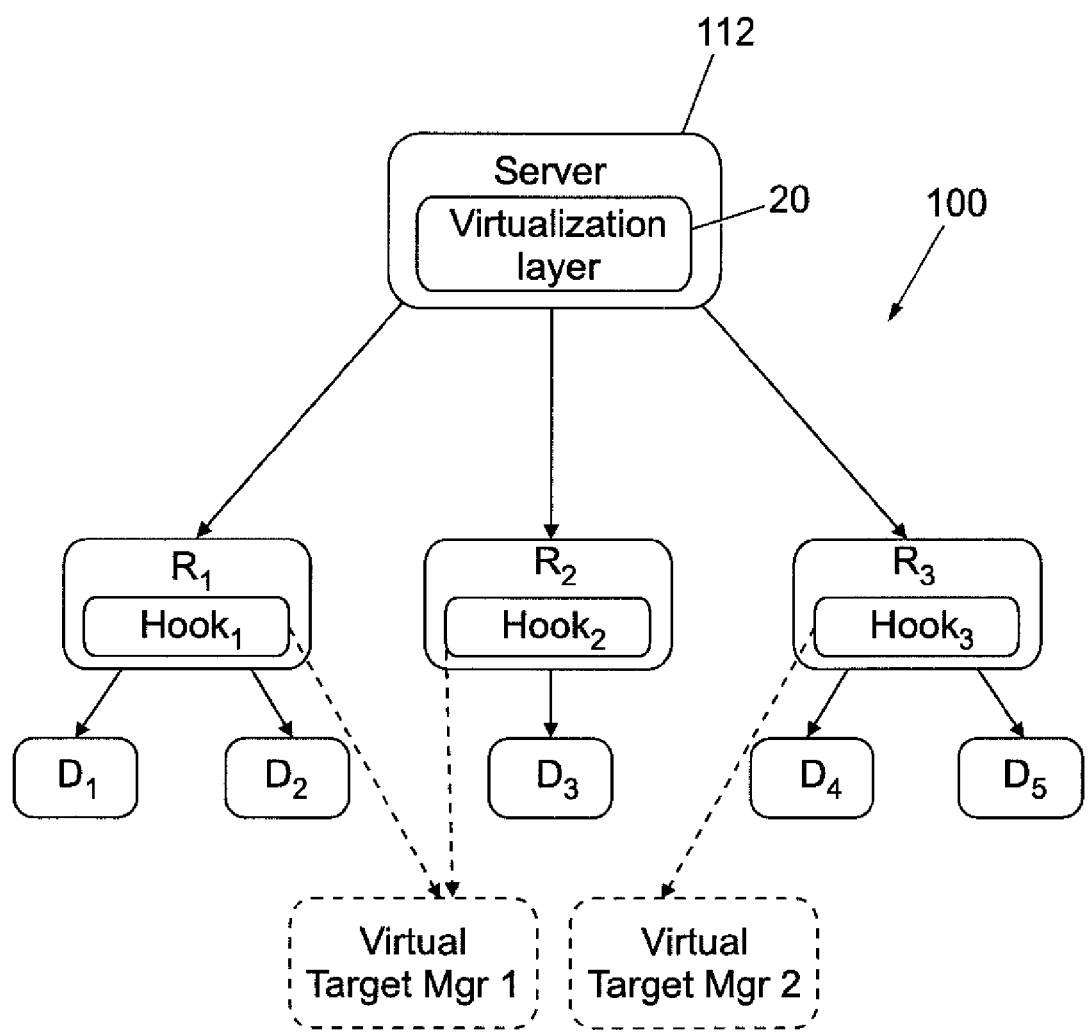
FIG. 2 is a block diagram of a testing system in accordance with the first embodiment.

Referring to FIG. 2, a testing system 100 for a software distribution program (or any other reverse client-server systems management application) comprises a traditional software distribution environment, including, for example, a distribution server 112 which houses the software distribution system and one or more repeaters $R_1$-$R_3$ and recipient devices $D_1$-$D_5$. As before, the recipient devices $D_1$-$D_5$ effectively act as real targets for the software distribution system. However, in order to test the scalability of the software distribution system (or any other reverse client-server systems management application), it is necessary to determine how the software distribution system (or any other reverse client-server systems management application) will behave when faced with a larger number of targets. Thus, the testing system also provides a number of virtual targets for the software distribution system.

The distribution server 112 is modified by the addition of a virtualization layer 20 and each repeater $R_1$-$R_3$ is provided with a hook ($Hook_1$, $Hook_2$, $Hook_3$). In use, the virtualization layer 20 divides a list of potential targets for the software distribution system into two groups. The first group contains all the real targets and the second group contains the virtual targets. This grouping can be done by verifying whether or not each potential target is already defined in the software distribution environment. Alternatively, the grouping could be performed by using a configuration file containing a list of all the available virtual targets, wherein if a potential target is contained in this list it is automatically designated as a simulated target.

A hook is a program which is invoked on receipt of a management request from the distribution server 112. Depending on the hook's configuration and the nature of the operation requested by the management request, a hook code is generated which specifies whether the management request should be transmitted to a real target or a virtual Target Manager. Thus, hooks enable different types of situations to be simulated. For example, a hook code can specify a fault (e.g. no disk space, target not reachable etc.) in addition to targets for the software distribution system.

Figure 3:
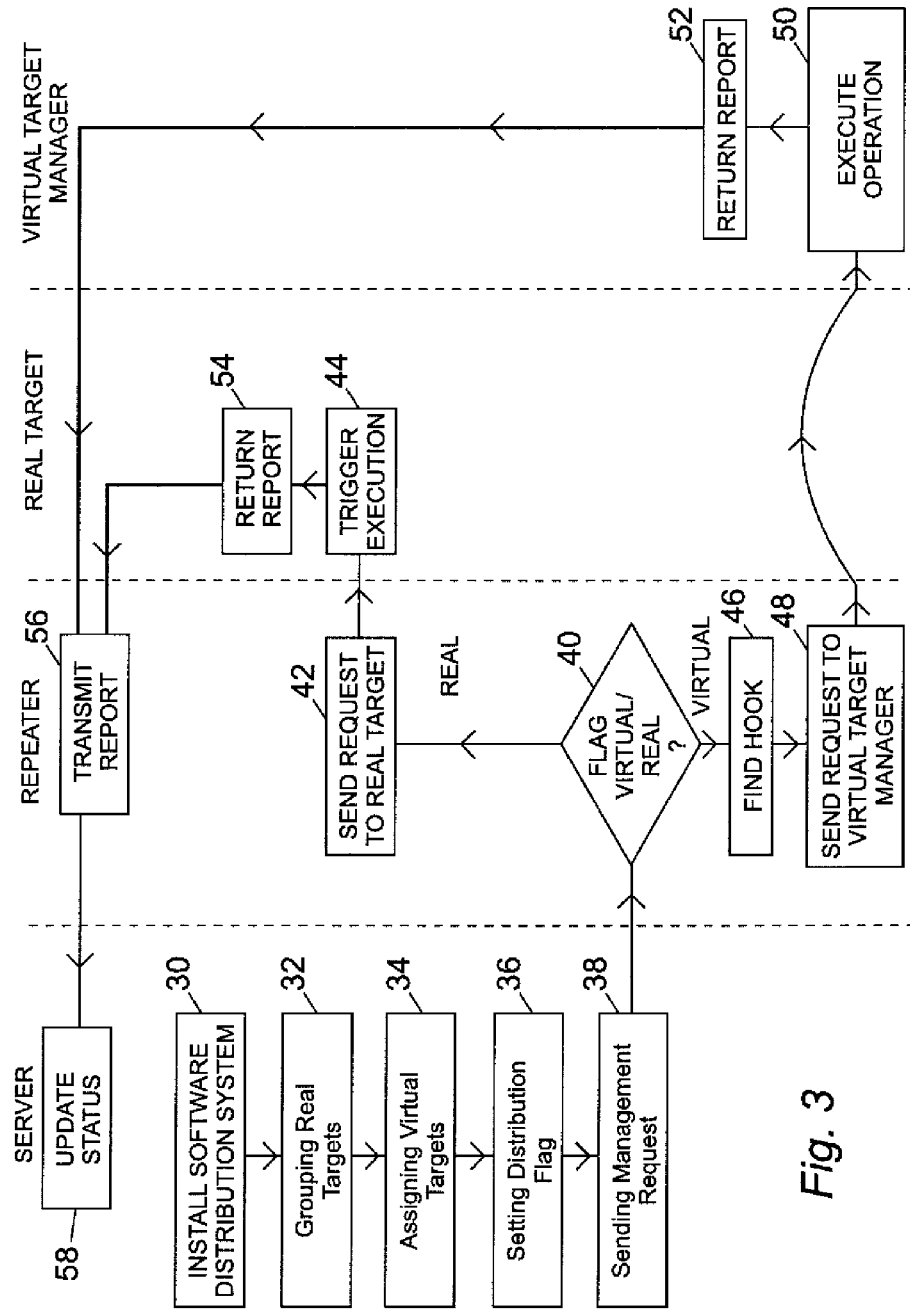
FIG. 3 is a flow-chart of the method of testing a system management program according to the second embodiment.

Referring to FIGS. 2 and 3, a first phase of a method of testing a system management program is conducted in the distribution server 112. More particularly, the first phase comprises the steps of:
  installing (30) and registering the system management program on the distribution server 112;
    grouping (32) real targets for the system management program according to their repeaters ($R_1$-$R_3$);
    assigning (34) virtual targets to the repeaters ($R_1$-$R_3$), and setting (36) a flag (called distribution_mode), which instructs the repeaters ($R_1$-$R_3$) to consider the targets as "virtual" targets; and
    sending (38) each repeater ($R_1$-$R_3$) a management request for a particular type of system management operation, data necessary for the operation; and a list of real and/or virtual targets for the operation.

Upon receiving a management request and an associated target list from the distribution server 112, each repeater ($R_1$-$R_3$) performs an operation comprising the following steps:
  checking (40) the management request's distribution_mode flag;
    pushing (42) the request to the real targets ($D_1$-$D_5$) specified in the distribution list; and triggering (44) the execution of the operation on these real targets ($D_1$-$D_5$), in the event that the value of the distribution_mode flag is set to REAL or is unspecified;
  looking up internal tables in the repeater ($R_1$-$R_3$) to find (46) the hook ($Hook_1$, $Hook_2$, $Hook_3$) that has been defined for that kind of operation and requesting the hook ($Hook_1$, $Hook_2$, $Hook_3$) to forward (48) the request to an appropriate Virtual Target Manager, in the event that the value of the distribution_mode flag is set to VIRTUAL.

On receipt of a management request, the Virtual Target Manager performs the following steps:
  executing (50) the system management operation requested in the management request; or simulating the execution of the system management operation depending on its configuration; and
  returning (52) a report on the outcome of the system management operation to the repeater ($R_1$-$R_3$).

Similarly, after executing a system management operation specified in a management request, each of the real targets ($D_1$-$D_5$) returns (54) a report to the repeater (from which the management request was sent), wherein the report contains information about the outcome of the system management operation for the real target ($D_1$-$D_5$).

The repeaters ($R_1$-$R_3$) then transmit (56) the reports (received from both the real targets and from the Virtual Target Manager) back to the distribution server 112, wherein the reports may be transmitted individually to the distribution server 112, or grouped together and transmitted in one shot to the distribution server 112. Upon receiving the reports from the repeaters ($R_1$-$R_3$), the distribution server 112 updates (58) the status of the operation in its central repository until the operation is completed for all the targets registered for it.

Modifications and alterations may be made to the above without departing from the scope of the invention.

The invention claimed is:

1. A testing system for a system management program, wherein the testing system comprises a server with one or more repeaters connected thereto; and one or more recipient devices and emulating devices connected to the repeaters, the emulating devices being configured to emulate the one or more of the recipient devices, comprising:
  the server is configured to determine a first class of devices on whom a system management operation is to be performed, determine a second class of devices on whom the system management operation is to be performed, the second class of devices being emulated by one or more emulating devices, set a flag in one or more messages to be issued by the server, wherein the flag indicates whether the intended recipient of the message is a device in the first class or the second class, and issue the messages;
  the repeaters are configured to direct the messages whose flags indicate that the intended recipients are members of the first class, to devices that are members of the first class, determine an appropriate emulating device to which to send the messages whose flags indicate that the intended recipients are members of the second class, and send the messages to the emulating devices determined therefore, wherein determining an appropriate emulating device comprises:
  using at least one internal table in the one or more repeater devices to find, from a plurality of software tools maintained by the one or more of the repeater devices, an appropriate software tool for the operation specified in the message; and
  requesting the appropriate software tool to forward the messages to the emulation devices;
the recipient devices are configured to execute a system management operation included in a message from the server on receipt of the message by the recipient devices;
the emulating devices are configured simulate execution of the system management operation included in a message from the server on receipt of the message by the emulation devices; and
wherein the recipient devices and emulating devices are further configured to generate a report detailing the outcome of the system management operation and transmit the report to the server.

2. A software distribution program testing system, comprising the testing system of claim 1, wherein the system management program is a software distribution program and the system management operation is a software installation operation.

3. A method of testing a system management program, the method comprising the steps of:
  determining a first class of devices on whom a system management operation is to be performed;
  determining a second class of devices on whom the system management operation is to be performed, the second class of devices being emulated by one or more emulating devices;
  setting a flag in one or more messages to be issued by the server, wherein the flag indicates whether the intended recipient of the message is a device in the first class or the second class;
  issuing the messages;
  directing the messages whose flags indicate that the intended recipients are members of the first class, to devices that are members of the first class, and executing the system management operation on the devices of the first class;
  determining an appropriate emulating device to which to send the messages whose flags indicate that the intended recipients are members of the second class, and sending the messages to the emulating devices determined therefore, wherein the determining is performed in one or more repeater devices, and comprises the steps of:
    using at least one internal table in the one or more repeater devices to find, from a plurality of software tools maintained by the one or more of the repeater devices, an appropriate software tool for the operation specified in the message;
    requesting the appropriate software tool to forward the messages to the emulation devices; and
  simulating the execution of the system management operation on the emulation devices;
  returning one or more reports to the server regarding an outcome of the execution or simulation of the system management operation; and
  updating a status of the server in accordance with the one or more reports.

4. The method as claimed in claim 3, wherein the step of determining a first class of devices on whom the system management operation is to be performed involves grouping devices in the first class according to the repeater devices to which they are connected.

5. The method as claimed in claim 3, wherein the step of determining a second class of devices on whom the system management operation is to be performed, involves assigning devices from the second class to one or more of the repeater devices.

6. The method as claimed in claim 3, wherein the step of returning one or more reports to the server comprises the steps of:
  transmitting the one or more reports to one or more of the repeater devices; and
  transmitting the one or more reports from the repeater devices to the server.

7. The method as claimed in claim 6, wherein the reports are transmitted to the server individually or collectively.

8. A method of testing a software distribution program comprising the steps of the method as claimed in claim 3, wherein the system management operation is an installation of the software and the step of executing the system management operation on the first class of devices and emulating devices comprises a step of installing the software on the first class of devices and emulating devices.

9. A computer program product comprising program code stored on a computer usable storage device that is operable for performing a method for testing a system management program when the program code is executed on a data processing system, the method comprising the steps of:
  determining a first class of devices on whom a system management operation is to be performed;
  determining a second class of devices on whom the system management operation is to be performed, the second class of devices being emulated by one or more emulating devices;
  setting a flag in one or more messages to be issued by the server, wherein the flag indicates whether the intended recipient of the message is a device in the first class or the second class;
  issuing the messages;
  directing the messages whose flags indicate that the intended recipients are members of the first class, to devices that are members of the first class, and executing the system management operation on the devices of the first class;
  determining an appropriate emulating device to which to send the messages whose flags indicate that the intended recipients are members of the second class, and sending the messages to the emulating devices determined therefore, wherein the determining is performed in one or more repeater devices, and comprises the steps of:
    using at least one internal table in the one or more repeater devices to find, from a plurality of software tools maintained by the one or more of the repeater devices, an appropriate software tool for the operation specified in the message; and
    requesting the appropriate software tool to forward the messages to the emulation devices;
  simulating the execution of the system management operation on the emulation devices;
  returning one or more reports to the server regarding an outcome of the execution or simulation of the system management operation; and
  updating a status of the server in accordance with the one or more reports.

\* \* \* \* \*